United States Patent
Eby et al.

[11] 3,728,749
[45] Apr. 24, 1973

[54] TIRE FLOAT AND METHOD FOR FORMING SAME

[75] Inventors: Jack A. Eby; Eugene F. Andersen, both of Vancouver, Wash.

[73] Assignee: Topper Floats, Inc., Vancouver, Wash.

[22] Filed: Feb. 8, 1971

[21] Appl. No.: 113,494

[52] U.S. Cl. ................................ 9/8 R, 114/0.5 F
[51] Int. Cl. ........................ B63b 21/52, B63b 35/00
[58] Field of Search .................. 9/8, 9; 114/0.5 BD, 114/0.5 F, 68, 69

[56] References Cited

UNITED STATES PATENTS

| | | | |
|---|---|---|---|
| 3,082,439 | 3/1963 | Hornbostel et al. | 9/8 R |
| 3,193,855 | 7/1965 | Chapman | 114/0.5 F |
| 2,814,055 | 11/1957 | Phillips | 9/8 R |
| 3,132,417 | 5/1964 | Irwin | 9/8 R |

Primary Examiner—Milton Buchler
Assistant Examiner—Gregory W. O'Connor
Attorney—Daniel P. Chernoff

[57] ABSTRACT

A method for converting used tire bodies into marine floats for use as moorings, buoys and the like. The tire body is provided with side panels of plywood, plastic or other material to fit over the sidewall openings on either side of the tire and thereby form an enclosed shell. Thereafter, urethane, polystyrene or other expandable plastic foam material is injected through an opening in one of the panels and expands to fill the entirety of the core cavity formed by the shell which functions as a mold. The foam material expands, forms a fused mass and secures itself to the interior of the tire and sidewall panels forming an integral shell and core, the curing of the foam being effected or accelerated by the application of heat if necessary. The injection hole may then be covered over, if desired, by fiberglass cloth to which an epoxy resin catalyst is applied to form a seal. Finally, the exterior of the shell is coated with epoxy paint or other sealant to provide a waterproof covering. Bolts or other fasteners are provided through the sides of the tire float for securing it to structures which are to be buoyantly supported thereby.

4 Claims, 3 Drawing Figures

Patented April 24, 1973                                    3,728,749

TIRE FLOAT AND METHOD FOR FORMING SAME

BACKGROUND OF THE INVENTION

The present invention relates to a method for converting used tire bodies into marine floats for use as moorings, buoys and the like, and is also directed to the new and improved form of tire float produced thereby.

At the present time there is growing ecological concern over the problem posed by the disposal of used tires where the tire carcass is not suitable, for structural or economic reasons (such as overly large or numerous punctures, off-color or size), for recapping with new tread. Because of the noxious odor and irritating fumes created when it is attempted to dispose of used tires by burning, and because at the present state of technology it is not yet feasible to recycle the rubber in old tires for use in the manufacture of new tires, the most common practice today in disposing the old, unserviceable tire bodies is to bury them in a dump or to store them as rubbish in junkyards, creating architectural eyesores because of their unsightly appearance. The tire disposal situation has lately become so serious in certain parts of this country that gasoline and tire service stations which receive old tires in exchange for new ones are charged a substantial fee by sanitation companies for the removal of old tires from the premises and their disposal in dump or junkyards. Accordingly, a real need exists today for an application in which used tire bodies, not suitable for recapping, can be utilized commercially and in a manner which will provide an alternative to their being treated as rubbish, thereby eliminating the problems which have heretofore been involved in their disposal.

The present invention is directed to a method for converting used tire bodies into marine floats suitable for moorings, buoys, fenders, and other marine applications requiring highly-buoyant, wear and damage-resistant bodies. In addition to alleviating the problem of disposal of the used tire bodies, the floats so produced in accordance with the herein disclosed method are more economical to fabricate and possess several important structural and functional advantages over prior art float and buoy designs.

SUMMARY OF THE PRESENT INVENTION

The present invention is directed to a method for converting used tire bodies into marine floats and buoys. In brief, the method encompasses the steps of: enclosing the sidewall opening of the tire with a pair of panel sections of plywood, plastic or other suitable material to form an enclosed shell; next injecting urethane, polystyrene or other suitable expandable plastic foam material through an opening in one of the side panels which then expands to fill the entirety of the core cavity formed inside the shell which functions as a mold while the foam material cures; and thereafter covering the exterior surface of the shell with a waterproof paint or sealant. If desired, bolts or other forms of fastener means may be provided through the sides of the tire float as formed according to the above-described process for securing it to structures intended to be buoyant supported thereon.

When urethane or other plastic foam material of similar characteristics is used for the core filling, it is not necessary to seal over the injection hole through which the foam is introduced into the interior of the tire cavity, since the urethane foam upon curing will be impervious to the effects of any gas, oil or other contaminant likely to be encountered by the float when in use. However, when using polystyrene or other similar type plastic foam material not having high resistance to break down in the presence of gasoline, oil and other common water contaminants, it will be preferable to seal the injection hole formed in the sidewall panel of the float by utilizing some form of water-tight covering such as fiberglass cloth impregnated with epoxy resin adhesive.

Also, while urethane and similar type plastic foam materials are self-curing at ordinary room temperatures, it may be advisable when utilizing polystyrene and like materials to effect or accelerate the curing, after the foam material has been injected into the cavity, by applying heat to the float assembly with either an internal steam probe or with exterior heating elements.

The tire float fabricated by the above-described process is extremely economical to produce since the used tire body and the sidewall panels are both inexpensive items and together they serve as a shell mold for the plastic foam material forming the core of the article. Also, because the peripheral surface of the toroidal float is comprised of resilient material (the tire body), there is but small likelihood of serious damage or wear of the float in use as the result of collisions with other obstacles. Further, since the core of the float is filled completely with a fused, lightweight solid material, the float, in contrast to previous designs utilizing entrapped air as the buoyant medium, is virtually sink-proof, since even sizeable punctures in the float body would not permit entry of sufficient amounts of water to counterbalance the high buoyancy of the float. The float is substantially maintenance-free because it resists marine growth and does not become waterlogged nor does it corrode over extended periods of use.

It is therefore a principal objective and advantage of the present invention to provide a novel process for converting a used tire body into a new and useful article, namely, a float or buoy suitable for use in moorings or other marine applications.

It is another principal objective, feature and advantage of the present invention to provide a new and improved form of float or buoy suitable for use in marine applications which is more economical to fabricate, virtually sink-proof, sturdier, long-lasting, service-free in use and substantially impervious to the effects of marine growth, gas, oil and other common corrosion agents found in water bodies.

It is still another principal feature and advantage of the present invention to provide a new and improved form of marine float or buoy of generally circular configuration whose outer shell is formed of a used tire body in conjunction with sidewall panels, the shell enclosing a highly-buoyant fused core formed of expanded foam plastic material.

The foregoing and other objectives, features and advantages of the present invention will be more readily understood upon consideration of the following detailed description of the invention, taken into conjunction with the accompanying drawings.

DESCRIPTION OF THE PREFERRED EMBODIMENT

Figure 1:
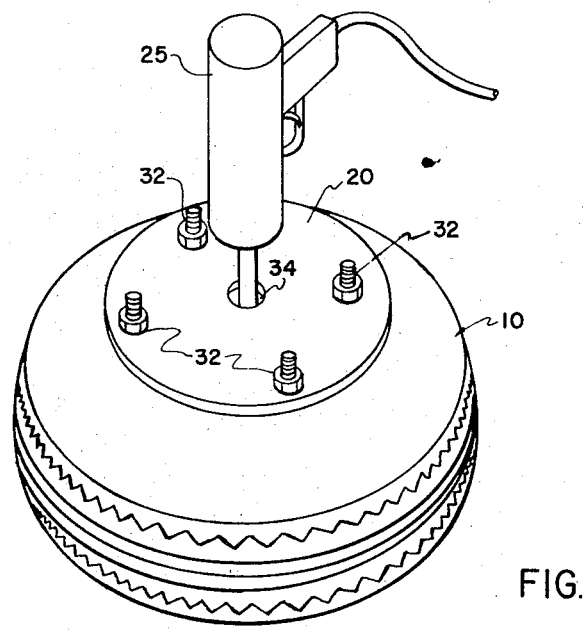
FIG. 1 is a pictorial view of an embodiment of a tire float being produced in accordance with the method of the present invention, the view depicting plastic foam material being injected therein to form the core filling.
Figure 2:
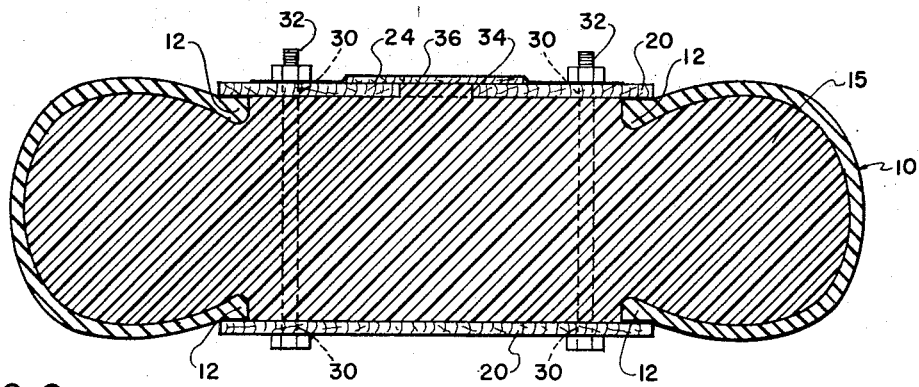
FIG. 2 is a sectional view taken through a diameter of the tire float showing details of its construction.

Referring now to the drawings, FIGS. 1 and 2 show an exemplary method for forming an embodiment of the tire float article in accordance with the present invention. A pair of panel sections 20 formed of plywood, plastic, rubber or other suitable material are placed over the respective sidewall openings of a conventional automobile or truck tire 10. In order to fully enclose the sidewall openings of the tire member the panels 20 extend beyond the edges of the beads 12 of the tire and are preferably of generally circular configuration so as to position symmetrically against the sidewalls of the tire. The sidewall panels 20 are held in position during the core forming process by clamping them together against the tire casing, either with temporary fasteners or external press means or, as shown in FIG. 2, by drilling openings 30 through the panels at corresponding locations and inserting tie bolt fasteners 32 to compress the panels tightly against the sidewall beads 12 of the tire body. The combination of the tire body 10 and the pair of sidewall panels 20 together form a toroidal shell or a shell mold enclosing a toroidal volume into which an expandable plastic foam material is introduced to provide the core filling 15.

As illustrated in FIG. 1, the foam material, while in the uncured, flowable state, is supplied from a source (not shown) such as a mixing vat to a conventional injection gun 25 which pumps the material into the core cavity via an opening 34 cut into one of the sidewall panels 20. One expandable plastic foam material suitable for forming the core filling 15 is urethane, such as that sold under the brand name Isofoam No. Se29-68 manufactured by Witco Chemical, Isocyanate Products Division, of Wilmington, Delaware. Urethane is a preferred type of core material for this application since it will cure, once catalyzed, in a relatively short time at room temperature and, as previously noted, it is highly resistant to breakdown in the presence of oil, gasoline or other contaminants commonly found in marine environments.

Another suitable type of expandable plastic foam material for the present application is polystyrene, which is more economical in cost than urethane and also possesses most of the desirable characteristics and advantages of the latter. One exemplary type of polystyrene found suitable for the present application is Dylite brand polystyrene pellets manufactured by Sinclair-Koppers Company, of Pittsburgh, Pennsylvania. However, unlike urethane, in order to cure polystyrene or similar-type expandable plastic foam material, it is usually necessary, or at least desirable, to accelerate the curing process by applying heat to elevate the temperature of the foam once it is in situ. To this end the core filling 15, when comprised of polystrene or similar type heat-cured expandable plastic material, can be cured by heat it, by means of a conventional steam probe (not shown) inserted into the interior of the core through another opening cut into one of the sidewall panels 20. Alternatively, the requisite heating can be applied to the core filling by means external to the article utilizing, for example, either a heating chamber or the conventional device utilized in tire recapping operations which supplies heat directly by conduction through an encircling metal band to the exterior of the tire.

The foam material 15 injected into the core formed by the tire body 10 and the enclosing sidewall panels 20 expands in the curing process to completely fill the entire volume of the cavity, including any punctures, pinholes, ruptures or other breaks in the tire carcass which extend through to the inner surface thereof. The foam material will also fill into the opening 34 cut into the sidewall panel for receiving the nozzle of the injection gun 25 as well as any additional opening cut therein for the steam probe if used. Upon curing, the core filling 15 forms a rigid, fused cellular mass which tightly secures itself to the interior of the tire casing and the sidewall panels, forming an integral body with its shell mold.

After the foam material has been introduced into the core cavity and any excess expanded material has been removed, the injection opening 34 can then be patched over, even before the curing process is fully completed, so as to completely seal off the core filling 15 from any point of contact with the external environment. One preferred form of patching employed for such sealing purposes, depicted in FIG. 2, comprises a layer of sheet of fiberglass cloth 24 placed over the hole opening 34 and impregnated with an epoxy resin catalyst applied in the form of a coating 36 to adhere the cloth to the surface of the sidewall panel 20 and provide a strong water-tight and impervious path over the opening. The provision of the patch over the injection hole 34, so as to completely seal off the core filling 15, is especially desirable when utilizing an expandable plastic foam filling of polystyrene or similar material which might be deleteriously affected through contact with contaminants ordinarily found in marine environments. In some applications, especially when the injection hole 34 is not unusually large and when urethane or similar type foam plastic material is utilized having high resistance to breakdown upon exposure to oil, gasoline and other harsh chemicals, it may be quite feasible to eliminate the patching over of the injection hole 34.

As a final step in the preparation of the tire float it may be desirable to apply a coating of epoxy paint or other suitable sealant over the exterior of the shell formed by the tire casing and the sidewall panels so as to provide an unbroken waterproof covering layer over the article.

Figure 3:
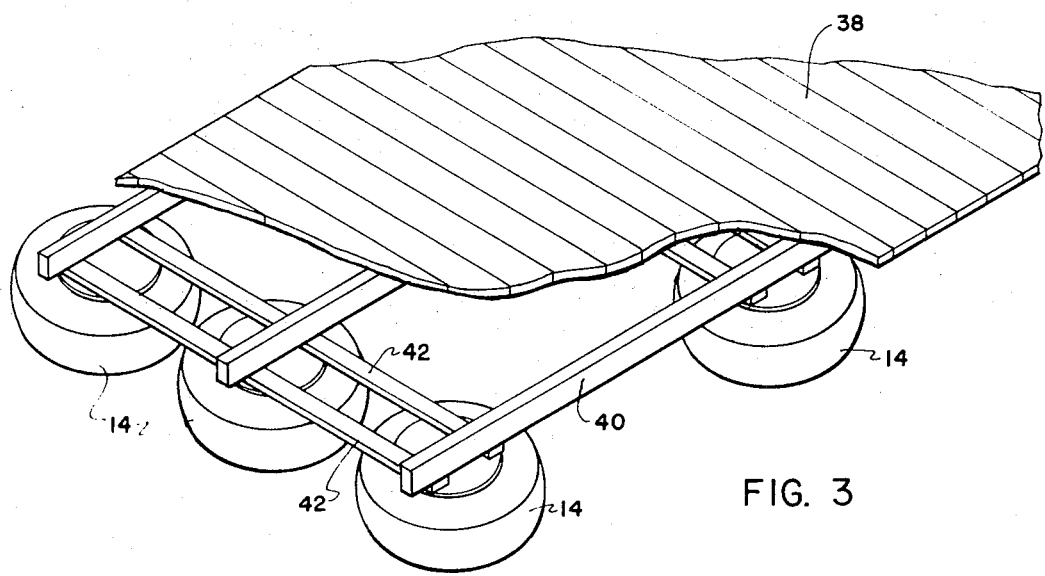
FIG. 3 is a pictorial view, partially broken away, showing an exemplary application of the tire float produced in accordance with the present invention providing buoyant support for a marine structure.

For the purposes of attaching the tire float, formed in accordance with the above-described process, to marine structures which are to be buoyantly supported thereby, the tie bolts 32 may, in the manner shown in FIG. 3, extend in length beyond the cross-sectional thickness of the float to provide means for fastening beams 40 and stringers 42 to the tire float 14 thereby forming a supporting base or frame for a floor or raft 38. Alternatively, the floats 14 can be attached as buoys to other marine structures by the simple expedient of nailing or screwing the structure directly into the sidewall panel 20, the plastic foam filling 15 in the core serving as an additional retention layer engaging any portion of the nail or screw fastener means extending beyond the thickness of the sidewall panel 20.

Finally, numerous additional ways of assembling and securing together the composite tire float articles 14 formed by the present process so as to provide a buoyant support for marine structures and vessels will be readily apparent to those skilled in the art. For example, in applications requiring the buoyant support of very heavy masses such as houseboats or cargo floats, a plurality of the tire floats 14 may be assembled together in contacting coaxial alignment and, where necessary, reinforced by inserting long steel rods from end to end of the assembled floats and parallel to their common axis.

The terms and expressions which have been employed in the foregoing abstract and specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What is claimed is:

1. A marine float comprising:
   a. a tire body;
   b. a pair of panels fitting over the respective side wall openings of said tire to form a toroidal shell having a resilient periphery; and
   c. a hollow core cavity formed inside said toroidal shell which is substantially completely filled with an expanded cured polymeric foam material.

2. The marine float of claim 1 wherein said expanded cured polymeric foam secures itself to the interior of said tire body and said side wall panels, thereby forming an integral body with said shell.

3. A method for converting a used tire into a marine float comprising the steps of:
   a. fitting a pair of panels over the respective side wall openings of said tire to form a toroidal shell enclosing a hollow core cavity;
   b. adding to said core cavity through an opening in said shell an expandable, foamable polymeric material; and
   curing said expandable, foamable material to form a rigid, fused polymeric mass which substantially completely fills said cavity, said shell functioning as a mold while said foam material cures therein.

4. The method of claim 3 wherein said fused polymeric mass tightly secures itself to the interior of said tire body and said side wall panels, thereby forming an integral body with said shell.

* * * * *